(12) United States Patent
Saeki et al.

(10) Patent No.: US 6,673,433 B1
(45) Date of Patent: Jan. 6, 2004

(54) STAINPROOF MATERIAL AND METHOD FOR MANUFACTURING THE SAME, AND COATING COMPOSITION AND APPARATUS THEREOF

(75) Inventors: Yoshimitsu Saeki, Kitakyushu (JP); Hideki Kobayashi, Kitakyushu (JP); Yoshitaka Mayumi, Kitakyushu (JP); Kazuya Tsujimichi, Kitakyushu (JP); Hiroyuki Fujii, Kitakyushu (JP); Junji Kameshima, Kitakyushu (JP); Tomoaki Morikawa, Kitakyushu (JP); Shinji Tanaka, Kitakyushu (JP); Yasushi Nakashima, Kitakyushu (JP); Tatsuhiko Kuga, Kitakyushu (JP)

(73) Assignee: Toto Ltd., Fukuoka-Ken (JP)

( * ) Notice: Subject to any disclaimer, the term of this patent is extended or adjusted under 35 U.S.C. 154(b) by 0 days.

(21) Appl. No.: 09/807,801

(22) PCT Filed: Oct. 19, 1999

(86) PCT No.: PCT/JP99/05766

§ 371 (c)(1),
(2), (4) Date: Jun. 22, 2001

(87) PCT Pub. No.: WO00/23528

PCT Pub. Date: Apr. 27, 2000

(30) Foreign Application Priority Data

Oct. 19, 1998 (JP) ............................................. 9-316847
Jan. 22, 1999 (JP) ............................................. 11-014896
Mar. 17, 1999 (JP) ............................................. 11-072527
Aug. 6, 1999 (JP) ............................................. 11-223255

(51) Int. Cl.[7] ........................ B32B 5/16; B32B 15/04; B32B 17/00; C03C 10/10; B01J 23/00
(52) U.S. Cl. .................. 428/323; 428/701; 428/702; 428/432; 428/457; 428/469; 501/6; 501/7; 502/344; 502/345
(58) Field of Search ................................ 428/323, 701, 428/702; 501/6, 7; 502/344–345

(56) References Cited

U.S. PATENT DOCUMENTS 3,640,712 A  2/1972  Field et al.
5,547,823 A  8/1996  Murasawa et al.

(List continued on next page.)

FOREIGN PATENT DOCUMENTS

EP  0113189  7/1984
EP  0816466  1/1986

(List continued on next page.)

OTHER PUBLICATIONS

Communication from the EPO, dated Feb. 20, 2003 that includes a Supplementary Partial European Search Report 2003 for Application No. EP99947973.

(List continued on next page.)

Primary Examiner—Deborah Jones
Assistant Examiner—G. A. Blackwell-Rudasill
(74) Attorney, Agent, or Firm—Jones Day

(57) ABSTRACT

Disclosed are antifouling material possessing excellent surface antifouling properties, particularly excellent antifouling activity against greasy stains and soils, a process for producing the same, and a coating composition and an apparatus for the antifouling material. The antifouling material comprises: a substrate; and an inorganic layer consisting essentially of an amorphous metal oxide, the inorganic layer containing an alkali metal and non-bridging oxygen in an amount effective in removing contaminants, derived from an exhaust gas, adhered on the surface of the inorganic layer by cleaning using running water alone to restore the diffuse reflectance of the surface of the inorganic layer to not less than 75% of the initial diffuse reflectance, the inorganic layer constituting the outermost fixed layer of the antifouling material.

23 Claims, 5 Drawing Sheets

U.S. PATENT DOCUMENTS

| | | | |
|---|---|---|---|
| 5,616,532 A | 4/1997 | Heller et al. | |
| 5,853,850 A | 12/1998 | Iwai et al. | |
| 5,853,866 A * | 12/1998 | Watanabe et al. | 428/312.8 |
| 5,885,362 A | 3/1999 | Morinaga et al. | |
| 6,013,372 A | 1/2000 | Hayakawa et al. | |
| 6,090,489 A | 7/2000 | Hayakawa et al. | |
| 6,368,668 B1 * | 4/2002 | Kobayashi et al. | 427/376.2 |

FOREIGN PATENT DOCUMENTS

| | | |
|---|---|---|
| EP | 0514312 | 11/1992 |
| EP | 0590477 | 4/1994 |
| GB | 2044806 | 10/1980 |
| GB | 2061309 | 5/1981 |
| GB | 2125809 | 3/1984 |
| GB | 2284822 | 6/1995 |
| JP | 50104232 | 8/1975 |
| JP | 5243817 | 4/1977 |
| JP | 53-098324 | 8/1978 |
| JP | 78/149281 | 12/1978 |
| JP | 54018485 | 2/1979 |
| JP | 54116032 | 9/1979 |
| JP | 54150438 | 11/1979 |
| JP | 55003874 | 1/1980 |
| JP | 5580763 | 5/1980 |
| JP | 55075739 | 6/1980 |
| JP | 55161868 | 12/1980 |
| JP | 56093768 | 7/1981 |
| JP | 57098567 | 6/1982 |
| JP | 58187471 | 11/1983 |
| JP | 59030865 | 2/1984 |
| JP | 60035065 | 2/1985 |
| JP | 02129269 | 5/1990 |
| JP | 5-123639 | 5/1993 |
| JP | 6-009995 | 1/1994 |
| JP | 06116512 | 4/1994 |
| JP | 06329949 | 11/1994 |
| JP | 06329950 | 11/1994 |
| JP | 08060040 | 3/1996 |
| JP | 9-227150 | 9/1997 |
| JP | 09-227157 | 9/1997 |
| JP | 09-227158 | 9/1997 |
| JP | 09-235140 | 9/1997 |
| JP | 09241531 | 9/1997 |
| JP | 9-278431 | 10/1997 |
| JP | 10215996 | 8/1998 |
| JP | 10225659 | 8/1998 |
| JP | 10237354 | 9/1998 |
| JP | 10330646 | 12/1998 |
| JP | 11092689 | 4/1999 |
| JP | 11197600 | 7/1999 |
| WO | WO 95/15816 | 6/1995 |

OTHER PUBLICATIONS

Patent Abstracts of Japan, Publication No. 10030162, published Feb. 3, 1998, for Application No. 08186231 filed Jul. 16, 1996.

"Highly Transparent and Photoactive $TiO_2$ Thin Film Coated on Glass Substrate" by S. Fukayama, et al., 187th Electrochemical Soc. meeting, Reno 21–26, May 1994, Extended Abstracts 95–1 (for abstract 735 p. 1102).

* cited by examiner

- $-M-O^-A^+$, $-M-OH$ : NON-CROSSLINKED OXYGEN
- M : METAL ATOM CONSTITUTING OXIDE SKELETON
- A : METAL ATOM ELECTROSTATICALLY BONDED TO NON-CROSSLINKED OXYGEN ATOM
- $-M-O-M-$ : HYDRATABLE CROSSLINKED OXYGEN ATOM
-  : TWO- OR THREE-DIMENSIONAL NETWORK STRUCTURE OF METAL OXIDE CONSTITUTED BY THERMALLY STABLE CROSSLINKED OXYGEN ATOMS

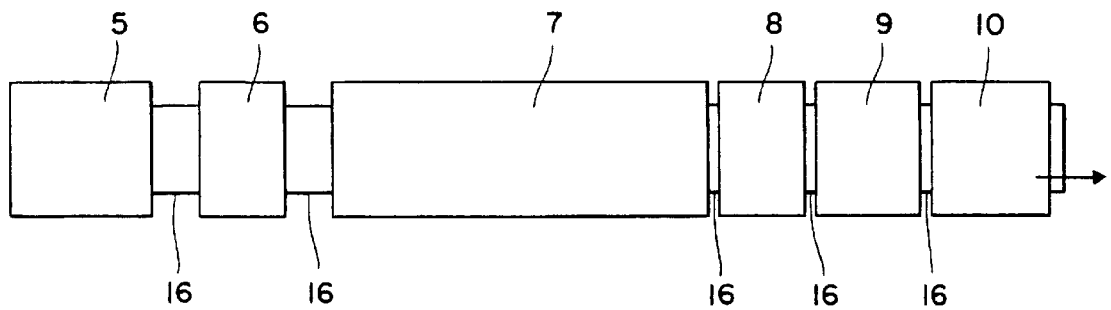
F I G. 4
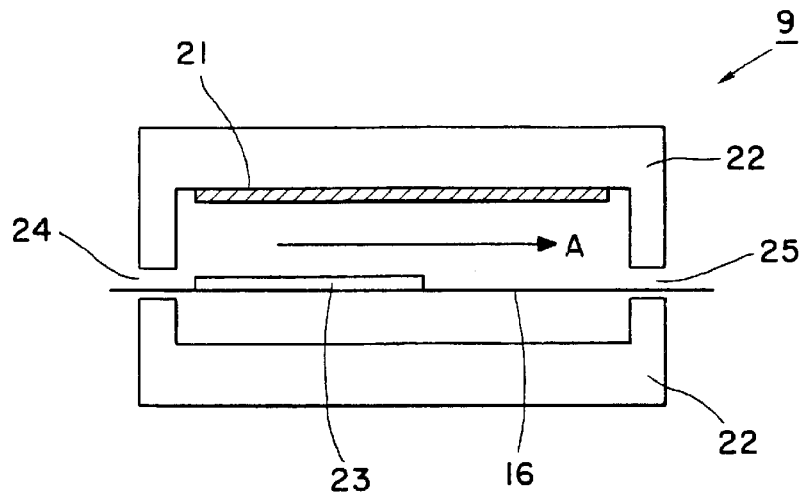
F I G. 5

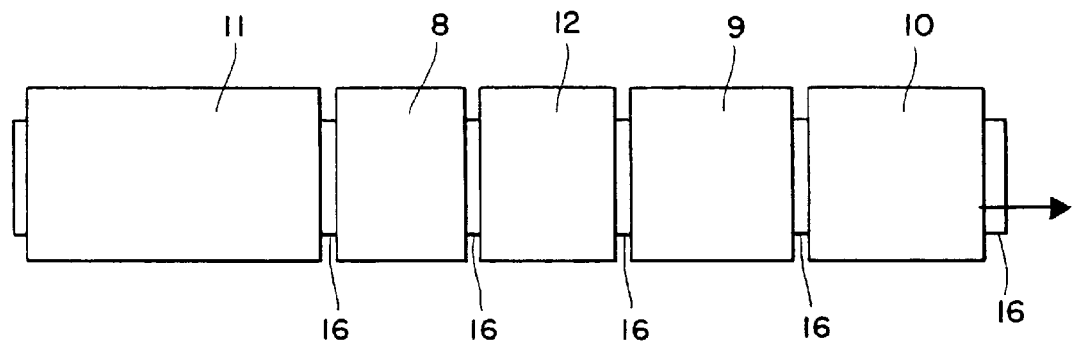
F I G. 6
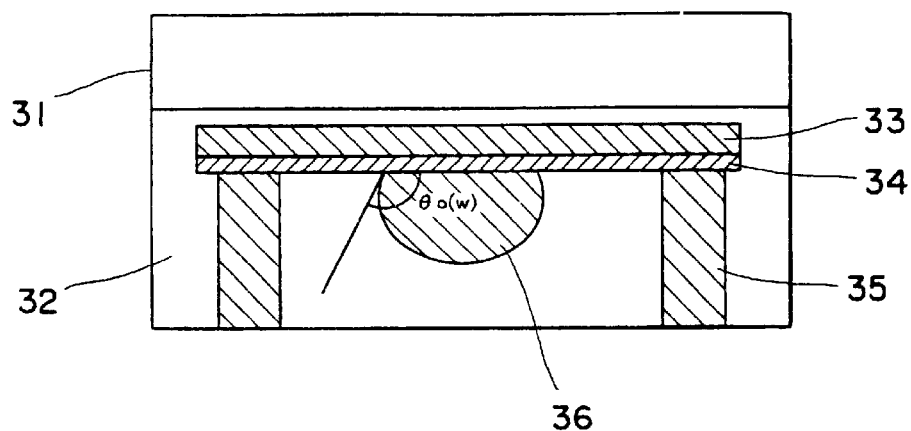
F I G. 7

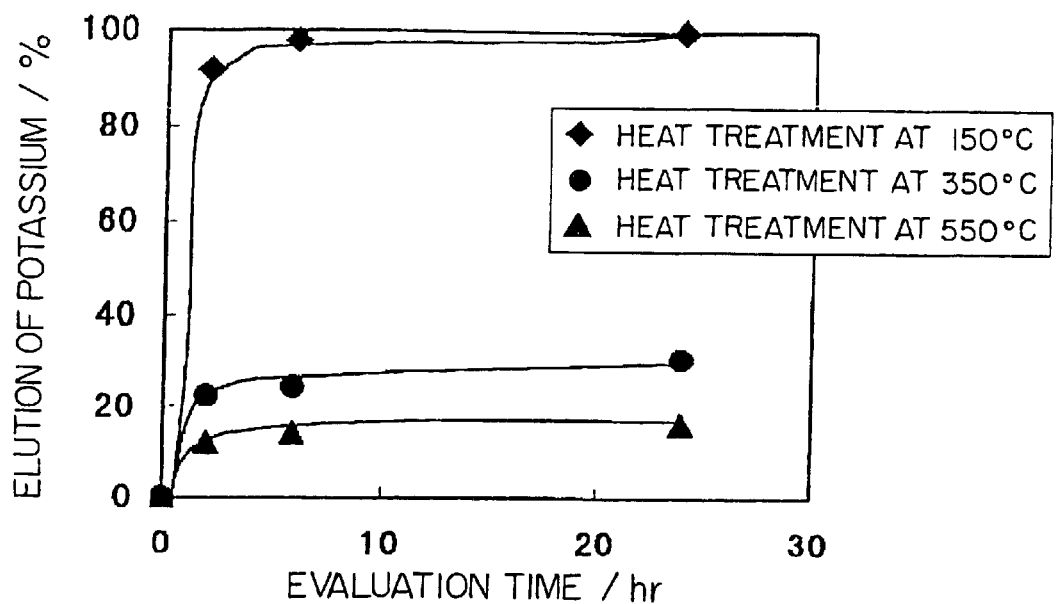
F I G. 8
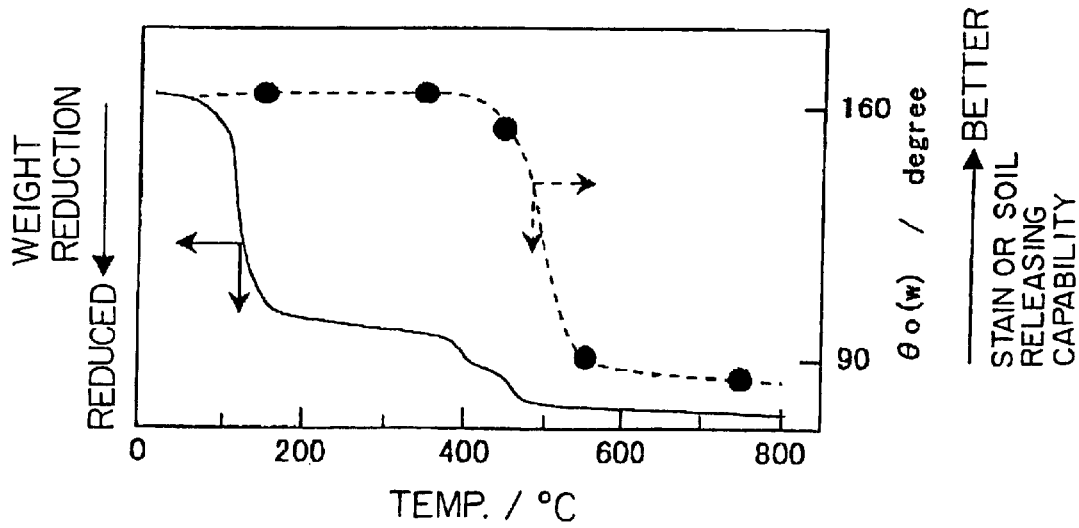
F I G. 9

STAINPROOF MATERIAL AND METHOD FOR MANUFACTURING THE SAME, AND COATING COMPOSITION AND APPARATUS THEREOF

BACKGROUND OF THE INVENTION

1. Field of the Invention

The present invention relates to a material having a surface possessing antifouling activity, particularly excellent antifouling activity against greasy stains or soils and a process for producing the same, and a coating composition for the antifouling material and an apparatus for the production process.

2. Background Art

Conventional methods for making the surface of materials antifouling comprises smoothening the surface to physically make it difficult for stains or soils to be deposited on the surface. In other methods, excellent oxidative degradation activity of a photocatalyst fixed onto the surface is utilized to degrade organic matter or stains or soils deposited on the surface are washed away by utilizing superhydrophilification of a photocatalyst. In these methods, however, satisfactory antifouling properties may not be enough when greasy stains or soils are badly deposited or when light is not enough to develop the photocatalytic activity cannot be obtained.

The following materials are known wherein an inorganic layer is formed on the surface thereof so as to associate with or so as not to associate with antifouling properties of the surface.

Japanese Patent Laid-Open No.98324/1978 discloses a method which comprises coating a colloidal silica-based inorganic coating onto a porous inorganic substrate to form an undercoat, coating an alkali silicate-based inorganic coating thereon to form a top coat, and then curing the coatings at room temperature or by heating to impart heat resistance and other properties to the substrate.

Japanese Patent Laid-Open No.123639/1993 discloses a method which comprises applying a synthetic resin coating as an undercoat onto the surface of a porous substrate, such as calcium silicate, applying an inorganic coating as an intermediate coat onto the undercoat, and then applying an inorganic coating composed mainly of an alkali metal silicate onto the surface of the intermediate coat.

Japanese Patent Laid-Open No.278431/1997 discloses a hydrophilic film wherein the center line average roughness Ra' on the surface of the film is 0.5 to 500 nm and the surface is composed mainly of concaves and convexes with the repetition length of concaves and convexes in plane direction of the surface being not more than 0.5 $\mu$m.

Japanese Patent Laid-Open No.227160/1997 discloses a photocatalytically hydrophilic member having a layer containing a photocatalytically active titanium oxide and an amorphous oxide.

Japanese Patent Laid-Open No.9995/1994 discloses a stain or soil removing method using a water-soluble alkali metal salt. This method is characterized in that a soil or stain release agent containing a water-soluble alkali metal silicate is coated onto stains or soils deposited onto the surface of the substrate to include the stains or soils in the soil or stain release agent and, thereafter, the soil or stain release agent containing the stains or soils are removed, thus removing the stains or soils. Since this soil or stain release agent is not fixed onto the substrate, the stain or soil removing method is merely a temporary soil or stain removing method like that using a surfactant-containing detergent.

None of the above prior art methods, however, disclose that the incorporation of satisfactory amounts of an alkali metal and non-bridging oxygen in an amorphous metal oxide can offer excellent antifouling properties and abrasion resistance.

SUMMARY OF THE INVENTION

Accordingly, it is an object of the present invention to provide an antifouling material, which, independently of environment, such as indoor or outdoor environment, can semi-permanently exhibit excellent surface antifouling properties, particularly excellent antifouling activity against greasy stains or soils and, in addition, is resistant to abrasion. It is also an object of the present invention to provide a process for producing the same, and a coating composition and apparatus for the antifouling material and the production process.

The present invention has been made with a view to attaining the above object. According to a first aspect of the present invention, there is provided an antifouling material comprising: a substrate; and an inorganic layer consisting essentially of an amorphous metal oxide, said inorganic layer containing an alkali metal and non-bridging oxygen in an amount effective to remove contaminants, derived from an exhaust gas, adhered on the surface of the inorganic layer with running water alone to restore the diffuse reflectance of the surface of the inorganic layer to not less than 75% of the initial diffuse reflectance, said inorganic layer being fixed as the outermost layer of the antifouling material.

According to a second aspect of the present invention, there is provided a coating composition for the formation of an antifouling inorganic layer on the surface of a substrate in the production of the antifouling material, said coating composition comprising: a solvent; and a solute, the solute comprising at least one member selected from the group consisting of an alkali silicate, an alkali aluminate, an alkali zirconate, an alkali borate, an alkali phosphate, and an alkali phosphonate.

According to a third aspect of the present invention, there is provided a process for producing an antifouling material, comprising the steps of: applying the coating composition onto the surface of a substrate to form a coating; and heating the substrate to fix the coating of the coating composition as an antifouling inorganic layer on the surface of the substrate.

According to a fourth aspect of the present invention, there is provided an apparatus for producing an antifouling material, said apparatus comprising coating means for applying the coating composition to form a coating onto the surface of a substrate; and heating means for rapidly heating the substrate to fix the coating of the coating composition as an antifouling inorganic layer onto the surface of the substrate.

BRIEF DESCRIPTION OF THE DRAWINGS

FIG. 4 is a diagram illustrating an embodiment of the apparatus for producing an antifouling material according to the present invention, which comprises: an apparatus for producing earthenware as a substrate, comprising a forming device 5, a glazing device 6, and a firing device 7; the apparatus of the present invention provided continuously from the apparatus for producing the substrate, the apparatus of the present invention comprising a coating device 8 for coating a coating composition, a rapid heating device 9, and a cooling device 10; and a carrying device 16 provided so that the substrate can be continuously carried through within each of the devices and through between the devices;

FIG. 5 is a schematic diagram showing the structure of the rapid heating device 9 shown in FIG. 4, wherein the rapid heating device 9 comprises a heating element 21, a heat-resistant material 22 which covers the heating element 21 and forms a heating space, carrying means 16 for holding the substrate 23, to be heated, within the heating space and carrying the substrate in a direction indicated by an arrow A in the drawing, a carry-in port 24 for carrying the substrate in the heating space, and a carry-out port 25 for carrying out the substrate from the heating space;

FIG. 6 is a diagram showing another embodiment of the apparatus according to the present invention, wherein a preheater 11 for preheating the substrate before coating a coating composition and a drier 12 for drying the substrate coated with the coating composition are additionally provided;

FIG. 7 is a schematic diagram illustrating the measurement of the contact angle in water of the inorganic layer according to one embodiment of the present invention with a salad oil;

FIG. 8 is a graph showing the results of a potassium ion elution test in Example C-1, that is, a test on the elution of potassium ions in tiles, with potassium silicate applied therein, which have been heat treated respectively at 150° C., 350° C., and 550° C.; and FIG. 9 is a diagram showing the results of the measurement of the contact angle in water of tiles, with potassium silicate applied thereon, which have been heat treated respectively at 150° C., 350° C., 450° C., 550° C., and 800° C., with a salad oil and the results of thermogravimetric analysis of potassium silicate in Examples C-2 and C-3 and Comparative Example C-1.

DETAILED DESCRIPTION OF THE INVENTION

Antifouling Material

Figure 1:
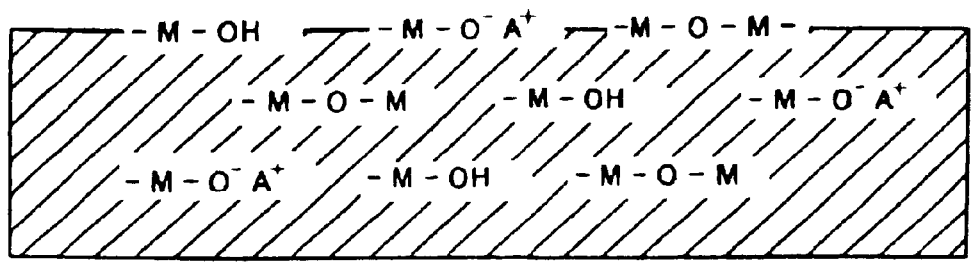
FIG. 1 is a conceptual diagram showing an inorganic layer according to one embodiment of the present invention.
Figure 1:

The antifouling material according to the present invention comprises: a substrate; and an inorganic layer as an outermost layer consisting essentially of an amorphous metal oxide. The antifouling material according to the present invention has various functions, for example, hydrophilifying, antifouling, antifogging, and antistatic functions. Better antifouling properties can be provided by synergistic effect of some of these functions.

(a) Substrate

Substrates usable in the present invention include metals, inorganic materials, organic materials, and composites of these materials. Specific examples thereof include interior materials, exterior materials, tiles, sanitary wares, tablewares, calcium silicate board, cement extruded boards and other building materials, ceramic boards, semiconductors and other new ceramics, insulators, glasses, mirrors, woods, and resins. Other applications include exterior of buildings, interior of buildings, sashes, windowpanes, structural members, exterior and coating of vehicles, exterior of machineries and articles, dustproof covers and coatings, traffic signs, various display devices, advertising towers or poster columns, noise barriers for roads, noise barriers for rail roads, bridges, exterior and coating of guard rails, interior facing and coating of tunnels, insulators, cover for solar cells, covers for solar energy collectors of solar water heaters, vinyl plastic hothouses, covers for lighting of vehicles, households, stools, bath tubs, wash basins, lighting equipment, covers for lighting, kitchenwares, tablewares, dishwashers, dishdryers, sinks, cooking ranges, kitchen hoods, ventilation fans, and films and the like for application on the surface of the above articles.

According to a preferred embodiment of the present invention, use of a substrate comprising a glazed layer as a surface layer provided on an earthenware body is preferred. The composition range of the surface glazed layer is as follows. Specifically, the surface glazed layer preferably comprises, as amorphous components, (i) 25 to 90% by weight of a tetravalent metal oxide, such as $SiO_2$ or $TiO_2$, (ii) 0.1 to 30% by weight of a trivalent metal oxide, such as $A_2O_3$, $Fe_2O_3$, or $B_2O_3$, (iii) 0.1 to 15% by weight of a divalent metal oxide, such as MgO, CaO, ZnO, or BaO, (iv) 0.1 to 15% by weight of a monovalent metal oxide, such as $K_2O$, $Na_2O$, or $Li_2O$, and (v) 0.1 to 70% by weight of other components, such as fluorides, phosphorus-containing materials, molybdenum compounds, vanadium compounds, antimony compounds, and tungsten compounds, and, crystalline components, (i) 0.1 to 70% by weight of an opacifier, such as $ZrSiO_4$ or $SnO_2$ and (ii) 0.1 to 10% by weight of a pigment.

(b) Inorganic Layer

The inorganic layer according to the present invention is the outermost layer consisting essentially of an amorphous metal oxide and contains an alkali metal and non-bridging oxygen in an amount large enough to develop desired antifouling properties.

The antifouling properties of the material according to the present invention may be evaluated by an exhaust gas contaminant releasing test using the surface diffuse reflectance as an index. The material according to the present invention has antifouling properties on a level such that the restoration of the diffuse reflectance is not less than 75%, preferably not less than 80%, more preferably not less than 90%.

The exhaust gas contaminant releasing test is carried out as follows. A sample to be evaluated is subjected to the step of depositing a contaminant from an exhaust gas onto the sample and the step of washing the contaminated sample with running water. Before and after these steps, the diffuse reflectance and the change in color difference are measured on the surface of the sample to evaluate the antifouling properties of the sample. The test procedure will be more specifically described.

At the outset, the initial diffuse reflectance of the surface of the sample is measured. The sample is then placed within a container connected directly to an exhaust pipe of a diesel car, and an exhaust gas is introduced into the container. In this case, the exhaust gas is introduced until the color difference on the surface of the sample reaches about 20 or until the diffuse reflectance reaches not more than 55%. Thus, the exhaust gas is forcibly deposited onto the surface of the sample. Next, the tile is washed by running water. The washing with running water is carried out by spraying water in an amount of about 400 cc/m$^2$ against the surface of the tile. For the samples after washing, the diffuse reflectance and the color difference are measured.

The term "diffuse reflectance" used herein refers to the proportion of the diffused light to the light incident on the surface of the sample and indicates the brightness of the color on the surface. The term "color difference" refers to the magnitude of the change in color expressed using brightness and chromaticity of the color on the surface of the sample. The term "restoration of diffuse reflectance" refers to the percentage change in diffuse reflectance determined by the following equation and is used as an index for the restoration of the cleanability of the sample by washing.

Restoration (%)=(Diffuse reflectance after washing with water spray/Initial diffuse reflectance)×100.

According to the present invention, the inorganic layer is in the state of being fixed as the outermost layer of the antifouling material. By virtue of the fixed state, the inorganic layer has abrasion resistance. According to the present invention, the level of the abrasion resistance is not particularly limited so far as the surface is neither deteriorated nor damaged under usual service conditions, and may be properly determined according to the applications of the antifouling material. For example, when a good surface state is maintained after rubbing the surface of the inorganic layer with a hard type eraser 100 times while applying a predetermined pressure (for example, 1,000 gf/cm$^2$ (9.8×10$^4$ Pa)), the abrasion resistance may be regarded as good.

The amorphous metal oxide may be a metal oxide capable of forming a three-dimensional network structure, such as $SiO_2$, $Al_2O_3$, $ZrO_2$, $B_2O_3$, or $P_2O_5$, or a combination of these metal oxides. Among them, an amorphous metal oxide composed mainly of $SiO_2$ is preferred from the viewpoint of film formability and hydrophilicity. Alternatively, the durability and the abrasion resistance of the surface of the layer may be further enhanced by using $SiO_2$ as the main component and, at the same time, using at least one of $Al_2O_3$, $ZrO_2$ and $B_2O_3$ in combination with $SiO_2$. In the inorganic layer according to the present invention, the three-dimensional network structure is properly developed, realizing satisfactory layer strength and in turn abrasion resistance.

Any of lithium, sodium, potassium, rubidium, cesium, and francium may be used as the alkali metal. They may be used alone or in combination of two or more. Among them, potassium, sodium, or lithium has considerably high antifouling activity. These alkali metals are considered to develop the antifouling properties by the so-called builder effect.

The content of the alkali metal in the inorganic layer is not less than 10% by weight in terms of oxide based on the composition in the surface of the layer. The expression "in terms of oxide" means that the content of the alkali metal ion in the inorganic layer is calculated in terms of the content of the alkali metal oxide. The amount of the alkali metal can be calculated from the composition of the surface obtained by X-ray photoelectron spectroscopy (XPS) from the surface portion of the inorganic layer.

FIG. 1 is a conceptual diagram of the inorganic layer according to the present invention. As shown in FIG. 1, the inorganic layer according to the present invention has a two-or three-dimensional network structure of oxide which is satisfactory for developing the abrasion resistance, and the alkali metal and the non-bridging oxygen are present in a portion ranging from the surface of the inorganic layer to the interior thereof.

The term "non-bridging oxygen" used herein refers to the following oxygen. In a large part of the coating composition as the material for the inorganic layer, M—OH (wherein M represents a metal element with specific examples thereof including silicon, aluminum, zirconium, boron, and phosphorus) is bridged upon heating to form M—O—M bonds. This results in an increase in molecular weight, and this material is strongly fixed onto the surface of the substrate to develop the abrasion resistance. In this case, a part of the M—OH is incorporated into the resultant polymer molecules and is present as the hydroxyl group (M—OH) without forming the M—O—M bond. A part of this M—OH is ionically bonded to alkali metal ions present in the coating composition to give M—O—X+ (wherein x represents an alkali metal) which can be reversibly converted to M—OH. According to the present invention, these M—OH and M—O—X+ are referred to as "non-bridging oxygen."

The non-bridging oxygen has high affinity for water molecules, and even functions to incorporate water molecules in the air into the substrate in its surface. Further, upon contact of the surface of the substrate with water, the non-bridging oxygen is likely to be bonded preferentially to water molecules rather than to molecules which are present on the surface of the substrate before water is deposited thereon. This results in the replacement of molecules, which are present as soils or stains on the surface of the substrate before water is deposited thereon, with water molecules. Consequently, the molecules, which are present on the surface of the substrate before water is deposited thereon, are removed from the surface of the substrate. Thus, the presence of the non-bridging oxygen on the surface of the substrate contributes to the development of a very high level of hydrophilicity on the surface of the substrate. This very high level of hydrophilicity offers an advantage that not only hydrophilic stains or soils but also lipophilic stains or soils can be easily washed away with water.

At the same time, the alkali metal on the surface of the inorganic layer renders greasy stains or soils water-soluble and are partially replaced with calcium ion or the like contained in water or the like by a substitution reaction, resulting in the development of builder effect. This is considered to permit stains or soils deposited on the surface of the inorganic layer to be more easily removed.

That is, the non-bridging oxygen contributes greatly to the hydrophilicity, and the alkali metal, by virtue of the builder effect, contributes greatly to the cleanability of the surface of the inorganic layer, and the synergistic effect of them is considered to markedly improve the antifouling properties of the surface of the inorganic layer. The present inventors have further found that the formation of the inorganic layer on the glaze layer can significantly enhance the antifouling properties. These suggest that the inorganic layer and the underlying glaze layer act in some synergistic fashion.

Among the non-bridging oxygens, those ionically bonded to the alkali metal ion (M—O—X+) can be detected also by photoelectron spectroscopy. However, a simple method may be used wherein an approximate content is determined from the amount of the alkali metal eluted upon immersion in warm water of 50° C. for 24 hr. The percentage elution of the alkali metal from the inorganic layer upon the immersion in warm water of 50° C. for 24 hr is preferably 0.001 to 80%, more preferably 20 to 80%. A percentage elution in the above range, even when the amount of M—OH is small, can provide higher hydrophilicity and in turn better antifouling properties because a satisfactory amount of M—O—X+ is present. That is, crosslinking of M—OH can develop M—O—M bonds to ensure the abrasion resistance, and, at the same time, a satisfactory amount of non-bridging oxygen (M—O—X+) and the alkali metal ion X+ properly present within the network structure can semi-permanently ensure excellent antifouling properties.

On the other hand, the amount of hydroxyl groups (M—OH) among the non-bridging oxygens can be determined by measuring a change in weight, in a temperature region where the weight reduction is created by dehydration between hydroxyl groups, by thermogravimetric analysis (TG). Differential thermal analysis (DTA) may also be used. Further, the hydroxyl group may be detected by infrared spectroscopy or infrared absorption analysis. The amount of the hydroxyl group among the non-bridging oxygens may be properly determined so that satisfactory antifouling properties and abrasion resistance are provided.

Accordingly, the amount of the non-bridging oxygen is preferably determined by taking into consideration both the percentage elution of the alkali metal and the results of the thermogravimetry (TG).

According to one preferred embodiment of the present invention, the contact angle in water of the inorganic layer with an oil (for example, oleic acid) is preferably not less than 100 degrees, more preferably more than 120 degrees. This condition is realized by excellent rolling-up action attributable to the formation of a hydrophilic and oil repellent fine structure provided as a result of the supply of water in the inorganic layer. By virtue of this, since combustion products, such as carbon black or diesel particulates, and powder caused by abrasion of tires are basically hydrophobic, they are less likely to adhere onto the surface of the inorganic layer.

Further, in the case of an inorganic layer having a contact angle in water thereof with an oil (for example, oleic acid) of more than 140 degrees, independently of the level of load, deposited greasy stains or soils can be quickly removed by water washing on such a force level as water spraying wherein the amount of water is small and the force of water is small. Therefore, when the contact angle in water of the inorganic layer with an oil is more than 140 degrees, the greasy soil or stain releasing capability of the inorganic layer is better.

According to one preferred embodiment of the present invention, the contact angle in water of the inorganic layer with an oil (for example, oleic acid) after the immersion in warm water of 50° C. for 6 hr is more than 120 degrees. In the inorganic layer after the immersion in warm water of 50° C. for 6 hr, the water-soluble component in the layer is substantially entirely eluted. Therefore, this state corresponds to the surface of the inorganic layer after repeated washing. For this reason, in the case of the surface of an inorganic layer having a contact angle in water thereof with an oil of more than 120 degrees, greasy stains or soils deposited thereon can be simply and repeatedly washed away.

The center line average roughness (Ra) of the surface of the inorganic layer is preferably Ra<500 nm, more preferably Ra<100 nm. The average particle-to-particle spacing (Sm) is preferably 1<Sm<500 nm. This can further improve the surface smoothness, and stains or soils are much less likely to be deposited onto the surface. At the same time, satisfactory fractal effect can be attained, contributing to improved hydrophilicity and improved oil repellency in the presence of water. The above surface smoothness may be realized, for example, by properly selecting a substrate having a smooth surface. According to the present invention, the "center line average roughness or roughness average Ra" means the value obtained by the following formula when sampling the measurement length L from the roughness curve in the direction of mean line, taking X-axis in the direction of mean line and Y-axis in the direction of longitudinal magnification of this sampled part and the roughness curve is expressed by Y=f(x):

$$Ra = \frac{1}{l}\int_0^l |f(x)|dx$$

In the present invention, the center line average roughness Ra is in accordance with the definition and designation specified in JIS B 0601-1994 and measured with a stylus type surface roughness tester according to JIS B 0651-1996. These JIS, together with English translation thereof, are easily available from Japanese Standards Association (1-24, Akasaka 4-chome, Minato-ku, Tokyo, Japan).

According to a preferred embodiment of the present invention, the thickness of the surface layer is preferably not more than 5 µm, more preferably 0.01 to 5 µm. This thickness can ensure satisfactory transparency and can improve the design effect. At the same time, stains or soils having a penetrating property, such as dyes and Indian inks, are less likely to be absorbed in the layer, resulting in improved antifouling effect.

According to a preferred embodiment of the present invention, the half-value period of electrification on the surface is preferably not more than 10 sec. In this case, moisture in the air is adsorbed onto the surface of the inorganic layer, and, thus, electrostatic electrification is less likely to occur. Therefore, advantageously, the adsorption of airborne smoke and soot caused by static electricity is less likely to occur.

According to a preferred embodiment of the present invention, the inorganic layer, when immersed in water at pH 7, has a negative zeta potential. In this case, bacteria or eumycetes and greasy stains or soils, which are negatively charged in water, are less likely to be deposited on the surface of the inorganic layer.

According to a preferred embodiment of the present invention, the surface of the inorganic layer has a pH value of more than 7. When the pH value is on an alkaline side, greasy stains or soils are likely to have poor affinity for the surface and, thus, the adhesion of the stains or soils to the surface becomes so low that the greasy stains or soils are can be more easily washed away by rainfall or the like.

According to a preferred embodiment of the present invention, the heat of wetting by water of the surface of the inorganic layer is at least 1 erg/cm$^2$ larger than the heat of wetting by water of the tile before the formation of the inorganic layer on the surface of the tile. This permits water to be more easily attracted by the surface of the inorganic layer and thus can improve the hydrophilicity and, at the same time, the oil repellency in the presence of water.

According to a preferred embodiment of the present invention, the surface layer is transparent. This can maintain the design effect of the substrate.

According to a preferred embodiment of the present invention, a metal oxide having photocatalytic activity may be further incorporated into the inorganic layer to further impart various properties derived from photoexcitation, for example, hydrophilicity and bactericidal activity. Suitable photocatalytically active metal oxides include $TiO_2$.

According to a preferred embodiment of the present invention, an antimicrobial component may be added to the inorganic layer. This can prevent the surface to be soiled with bacteria, mold, or algae. In this case, silver, copper, zinc and the like are suitable as the antimicrobial component.

According to one embodiment of the antifouling material according to the present invention, a substrate comprising a body having thereon a glaze layer containing a particulate material and/or a transparent thin layer may be used. Such substrates include outdoor tiles and interior tiles.

Particulate materials include, for example, materials having elements, such as silicon, aluminum, iron, titanium, magnesium, calcium, zirconium, zinc, cobalt, manganese, chromium, copper, silver, lead, and nickel. Specific examples thereof include pigment particles, opacifier particles, and glaze material particles which have remained dissolved in a vitreous component.

Outdoor tiles include exterior tiles, pavement tiles, and interior tiles for tunnels. The formation of the inorganic layer according to the present invention on a tile comprising a body bearing a glaze containing an unmelted particulate material, such as zircon or silica, enables various stains or soils deposited on the exterior to be removed by utilizing the hydrophilic nature of the surface. Further, since this inorganic layer is oil repellent in the presence of water, it can suppress the deposition of oil-containing soils or stains such as exhaust gases and smoke and soot in urban areas. Further, since the surface of the inorganic layer is rendered hydrophilic and oil-repellent in the presence of water or water vapor, the electrostatic adsorption of airborne smoke and soot onto the surface can be prevented.

Another preferred substrate is an interior tile. The formation of the inorganic layer according to the present invention on a tile comprising a body bearing a glaze containing an unmelted particulate material, such as zircon or silica, enables various stains or soils deposited on the interior to be removed by utilizing the hydrophilic nature of the surface. Further, since this inorganic layer is oil repellent in the presence of water, it can suppress the deposition of soils or stains produced in kitchens, such as salad oils, and soils or stains produced in bathrooms, such as grime or scale. Furthermore, since the surface of the inorganic layer is rendered hydrophilic and oil-repellent in the presence of water or water vapor, the electrostatic adsorption of airborne smoke and soot onto the surface can be prevented.

Coating Composition

The coating composition for an inorganic layer according to the present invention comprises a solvent and a solute.

The solute is composed mainly of at least one member, as a metal salt which upon heating described later can form an amorphous metal oxide, selected from the group consisting of alkali silicates, alkali aluminates, alkali zirconates, alkali borates, alkali phosphates, and alkali phosphonates.

Specific examples of preferred solutes include alkali silicates represented by formula $Me_2O \cdot nSiO_2$ wherein Me represents an alkali metal, for example, water glass, potassium silicate, lithium silicate, sodium silicate, and silica. According to the present invention, the coating composition contains at least one metal selected from the group consisting of francium, cesium, rubidium, potassium, sodium, and lithium. Preferred alkali metal silicates include, for example, potassium silicate, sodium silicate, and lithium silicate. When one alkali metal silicate is solely used, lithium silicate exhibits good greasy stain or soil releasing properties. Combined use of a plurality of the alkali metal silicates can improve the water resistance, alkali resistance, and acid resistance of the inorganic layer. Alkali metal silicates commercially available in the form of an aqueous solution are also usable.

The use of an alkali metal silicate can form an inorganic layer having good adhesion even at a low temperature of about 150° C. to the surface of the substrate. Further, an inorganic layer having high concentrations of non-bridging oxygen and alkali metal can be formed. This inorganic layer has excellent greasy stain or soil releasing properties.

The solvent may be one composed mainly of water. The solvent, however, is not particularly limited to this only.

According to a preferred embodiment of the present invention, the coating composition contains a second component. Specifically, the second component is selected from the group consisting of aluminum, titanium, silicon, zirconium, zinc, cerium, tin, antimony, strontium, iron, chromium, phosphorus, boron, cobalt, manganese, copper, silver, platinum, gold, vanadium, tantalum, and bismuth and metal compounds of the above metals. Specific examples of metal compounds include $SiO_2$, $SiO_3$, $Si(OH)$, $Al(OH)_3$, $TiCl_4$, and $Ti(OC_3H_7)_4$. The addition of the second component can impart contemplated functions. For example, $Al_2O_3$, $TiO_2$ and the like, which has high heat of wetting by water, are preferred for imparting hydrophilicity. Cerium capable of causing self-deactivation of ultraviolet light is preferred for ultraviolet absorption. When antimicrobial activity is desired, oxides of copper and silver are preferred. For antifouling against greasy stains or soils, alkali metal oxides are highly effective and thus are preferred. The addition of phosphorus and boron can advantageously improve the durability of antifouling materials.

According to a preferred embodiment of the present invention, the concentration of the alkali metal silicate in the coating composition is preferably 0.001 to 35% by weight, more preferably 0.001 to 20% by weight, on a solid basis. When the concentration is in the above range, a surface having good properties and good strength can be provided. Further, in this case, it is possible to provide antifouling materials the surface of which is even and smooth and has good gloss.

According to the most preferred embodiment of the present invention, the coating composition basically comprises:

(1) an alkali metal silicate;
(2) a second component; and
(3) a solvent.

According to a preferred embodiment of the present invention, the coating composition contains a surfactant. The addition of the surfactant enables the coating composition to be evenly coated.

The average crystallite diameter of the second component is preferably not more than 100 nm. The upper limit of the average crystallite diameter is preferably about 20 nm, more preferably about 10 nm. The lower limit of the average crystallite diameter is preferably about 1 nm, more preferably about 3 nm. An average crystallite diameter of the second component particle in the above range makes it possible to prevent loss of transparency, of a surface with the composition applied thereto, derived from scattering of visible light caused by the particles.

Further, the coating composition, upon heat treatment described later, can form an inorganic layer having excellent antifouling properties and abrasion resistance.

Production Process of Antifouling Material (a) Coating of Coating Composition onto Substrate According to the process of the present invention, the coating composition is coated onto a substrate. Examples of suitable methods for coating the coating composition include spray coating, dip coating, flow coating, spin coating, roll coating, brush coating, and sponge coating. According to a preferred embodiment of the present invention, the coating composition is coated onto the substrate by spray coating.

According to a preferred embodiment of the present invention, the substrate is preheated before coating of the coating composition. The preheating of the substrate may be carried out by heating the surface of the substrate to 20 to 400° C. The preheating of the substrate is advantageous in that, upon coating of the coating composition onto the surface of the preheated substrate, the coating composition evenly spreads and yields an even coating.

According to a preferred embodiment of the present invention, the substrate coated with the coating composition may be dried before heat treatment. Heat treatment described below applies a large heat value to the substrate. Presence of excess water or solvent component on the substrate leads to a fear of the smoothness of the surface of the substrate being lost as a result of rapid evaporation of water or the solvent component and the like due to a rapid temperature change. Therefore, in some cases, preferably, excess water or solvent component is previously removed by drying. The drying may be carried out by air blasting or heating.

Figure 2:
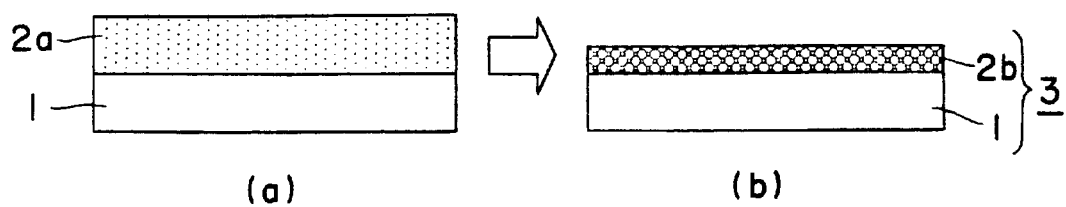
FIG. 2 is a diagram illustrating one embodiment of the process for producing an antifouling material according to the present invention, wherein (a) shows the state of an assembly before heat treatment and (b) shows the state of the assembly after heat treatment and wherein a layer 2a of a coating composition coated onto a substrate 1 is heat treated to form a thin layer 2b for imparting a multi-function to the substrate 1.
Figure 3:
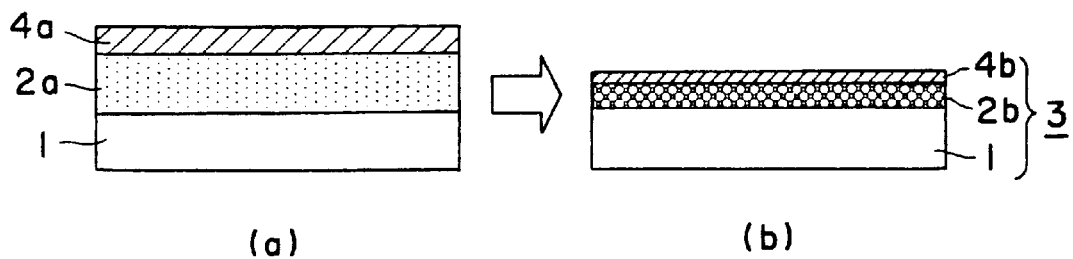
FIG. 3 is a diagrams illustrating another embodiment of the process for producing an antifouling material according to the present invention, wherein (a) shows the state of an assembly before heat treatment and (b) shows the state of the assembly after heat treatment and wherein, upon rapid heating of a layer 2a of a coating composition coated on the substrate 1 and a layer 4a, the layer 2a is converted to a thin layer 2b for imparting a multi-function to the substrate 1 while the layer 4a is converted to a layer 4b which has non-bridging oxygen and contributes to the development of hydrophilicity.

FIG. 2(a) is a schematic diagram showing an assembly comprising a layer 2a of a coating composition coated onto a substrate 1. Upon heat treatment described below, the coating composition layer 2a is brought to a thin layer 2b which functions to impart multi-function to the substrate 1. Thus, an antifouling material 3 is obtained.

According to a preferred embodiment of the present invention, the coating composition may be coated onto the surface of the substrate so as to form a stacked or multi-layered coating. Specifically, an identical coating composition may be provided and coated on the surface of the substrate a plurality of times. Alternatively, a plurality of different coating compositions may be provided followed by successive coating of the plurality of different coating compositions onto the surface of the substrate. The "coating to form a stacked or multi-layered coating" refers to the so-called "multi-coating" or "recoating." In this case, an even coating can be realized.

(b) Heat Treatment

The substrate coated with the coating composition is then heat treated.

The heat treatment permits hydroxyl groups (—M—OH (wherein M represents, for example, silicon) in the coating composition to be bridged to properly develop the three-dimensional network structure of —M—O—M—. This treatment functions to fix an inorganic thin layer having excellent antifouling properties and abrasion resistance onto the substrate.

The heat treatment is preferably carried out by bringing the surface of the substrate to 100 to 800° C., more preferably 150 to 600° C., still more preferably 150 to 500° C., most preferably 200 to 500° C. The heat treatment temperature, however, is not limited to this only. When the heat treatment temperature is in the above range, the three-dimensional network structure of —M—O—M— is properly developed to improve the strength of the inorganic thin layer, thereby imparting excellent abrasion resistance. The presence of a sufficient amount of non-bridging oxygen M—O—M+ and the presence of a proper amount of an alkali metal ion X+ within the network structure can improve the hydrophilicity and the cleanability, thereby imparting excellent antifouling properties. That is, realization of well balanced abrasion resistance and antifouling properties can be expected.

The heat treatment time may be properly determined according to the heat treatment temperature, and is not particularly limited. According to a preferred embodiment of the present invention, however, the heat treatment is carried out by "rapid heating." As used herein, the term "rapid heating" means heating for such a period of time that, although heat is evenly spread to the coating composition on the substrate, the temperature of the whole substrate does not yet reach the temperature of the coating on the surface of the substrate. Therefore, preferably, the rapid heating is carried out by intensively applying heat to only the surface of the substrate.

More specifically, the rapid heating time is preferably about 2 to 60 sec, more preferably 5 to 60 sec. Rapidly heating the surface of the substrate to the above temperature can realize the production of an antifouling material having satisfactory properties with high efficiency. This is particularly because heating to the above temperature range results in the formation of non-bridging oxygen with high efficiency which is very advantageous from the viewpoint of the development of hydrophilicity. Further, since the whole substrate does not reach the high temperature, breaking or cracking due to heat shock during temperature rise can be effectively prevented. Further, at the time of cooling, similar phenomena can be effectively prevented.

According to a preferred embodiment of the present invention, the heating temperature is kept substantially constant during rapid heating. According to a preferred embodiment of the present invention, the temperature of the atmosphere, in which the substrate is placed during rapid heating, is preferably 100 to 1000° C., more preferably 200 to 1000° C.

According to a preferred embodiment of the present invention, the rapid heating is carried out using heating means of which the heating value per unit area is not less than 120 MJ/m²·hr, more preferably not less than 400 MJ/m²·hr.

The rapidly heated substrate is then cooled to provide a final antifouling material. According to a preferred embodiment of the present invention, the cooling may be rapidly carried out.

According to another preferred embodiment of the present invention, instead of the rapid heating, the heat treatment time may be brought to 1 to 60 min. In this case, despite the fact that the temperature is below the temperature used in the rapid heating, an inorganic layer having excellent antifouling properties and abrasion resistance can be formed. More specifically, the atmosphere temperature is preferably 150 to 700° C.

According to one preferred embodiment of the present invention, the heat of immersion on water of the inorganic layer after the heat treatment is preferably larger than that before the heat treatment. The heat of immersion on water include heat of hydration ionic non-bridging oxygen (M—O—X+), hydroxyl group-based non-bridging oxygen (M—OH), and heat of adsorption derived from hydrogen bonds of water molecules. In calculating the heat of immersion, it should be noted that, when reversibly hydratable crosslinkable oxygen atoms are present in the inorganic layer, these oxygen atoms function as hydroxyl groups (M—OH) in the presence of water and thus are regarded as being embraced in the hydroxyl group-based non-bridging oxygen (M—OH). In the case of an inorganic layer wherein the heat of immersion on water of the inorganic layer after the heat treatment is preferably larger than that before the heat treatment, the hydrophilic and oil repellent nature attributable to the non-bridging oxygen can be significantly developed, and greasy stains or soils deposited on the surface of the inorganic layer can be simply washed away by running water.

According to one preferred embodiment of the present invention, the heat of immersion on water of the inorganic layer is larger than the heat of immersion of the inorganic layer on an oil. In this inorganic layer, since the affinity of water for the inorganic layer is larger than the adhesion of the greasy stains or soils to the inorganic layer, supply of water permits the inorganic layer to exhibit excellent hydrophilic and oil repellent nature and thus can easily remove the greasy stains or soils deposited on the inorganic layer.

Apparatus for Producing Antifouling Material

According to the present invention, there is provided an apparatus suitable for producing the antifouling material.

FIG. 4 is an explanatory view of the apparatus for producing an antifouling material according to the present invention. In the apparatus shown in the drawing, the apparatus according to the present invention is provided continuously from an apparatus for producing a substrate. As can be seen from the drawing, the apparatus for producing the so-called "earthenware" as the substrate comprises a forming device 5, a grazing device 6, and a firing device 7. The apparatus according to the present invention comprises a device 8 for coating a coating composition, a rapid heating device 9, and a cooling region 10. The apparatus for producing a substrate is provided so as to continue to the apparatus according to the present invention. Further, a carrying device 16 is provided so that the substrate can be continuously carried through within each device and between devices. Therefore, the apparatus for producing a substrate, comprising a substrate forming device 5, a glazing device 6, and a firing device 7 may be properly selected and may have other construction according to the substrate to which the process of the present invention is to be applied. The apparatus according to the present invention is not limited to an apparatus comprising a coating device 8 for coating a coating composition, a rapid heating device 9, and a cooling region 10, and connotes an apparatus, as shown in FIG. 4, which can continuously produce an antifouling material from the production of a substrate. That is, a construction, wherein an apparatus comprising a coating device 8 for coating a coating composition, a rapid heating device 9, and a cooling region 10 are provided just behind (downstream of) the apparatus for producing a substrate, also falls within the scope of the present invention.

A substrate is formed in the forming device 5 shown in the drawing. The substrate is coated with a glaze by means of the grazing device 6, and then fired in the firing device 7. The substrate, which has been fired in the firing device 7, has still high temperature. According to a preferred embodiment of the present invention, the coating composition is coated onto the substrate when the substrate is in the state of a certain high temperature.

The construction of the coating device 8 shown in the drawing may vary depending upon selected coating methods. For example, when spray coating is selected, the coating device comprises a device for spraying a coating composition.

FIG. 5 is a schematic diagram showing the structure of the rapid heating device 9 shown in FIG. 4. The rapid heating device 9 basically comprises a heating element 21, a heat-resistant material 22 provided so as to cover the heating element 21 and to form a heating space, carrying means 16 for holding a substrate 23, to be heated, within the heating space and carrying the substrate 23 in a direction indicated by an arrow A in the drawing, a carry-in port 24 for carrying the substrate in the heating space, and a carry-out port 25 for carrying out the substrate from the heating space.

The heating element 21 is not particularly limited so far as it can rapidly heat the substrate. Heating elements usable herein include electrical heating elements and heating elements which burn a gas or other fuel to generate heat. As described above, preferably, the rapid heating is carried out using heating means of which the heating value per unit area is not less than 120 MJ/$m^2$·hr, more preferably not less than 400 MJ/$m^2$·hr. Therefore, preferably, the heating element can generate the above heating value. The distance of the surface of the substrate from the heating element may be properly determined so that a satisfactory heating value for rapid heating is applied to the substrate. The distance would be generally about 5 to 300 mm. Therefore, preferably, the heating element is provided so that the distance between the heating element and the substrate is fixed or variable in the above range.

As described above, preferably, the heating temperature is kept substantially constant during rapid heating. Therefore, preferably, the heating space of the rapid heating device is satisfactorily insulated by an insulating material 22 and undergoes no significant influence of heat loss from the carry-in port 24 and the carry-out port 25. The carry-in port 24 and the carry-out port 25 may be always in released state as shown in FIG. 5. Alternatively, the carry-in port 24 may be constructed so that the port 24 is usually closed while the port 24 is opened when the substrate is carried in the rapid heating device. Likewise, the carry-out port 25 may be constructed so that the port 25 is usually closed while the port 25 is opened when the substrate is carried out from the rapid heating device. The length of the region where the temperature for rapid heating is kept substantially constant may be properly determined. The length would be generally 5 cm to 30 m.

The construction of the carrying device 16 is not particularly limited so far as the device can hold the substrate within the heating space and can carry through the heating space. The carrying device 16 is preferably a belt conveyor or a roller conveyor. According to a preferred embodiment of the present invention, in order to attain good thermal conduction within the heating space, the carrying device 16 is constructed so that the heating space is not excessively thermally partitioned. For example, the carrying means is preferably a belt conveyor of a heat-resistant porous belt having a percentage surface opening of not less than 20% or a roller conveyor of a group of heat-resistant rollers. Further, according to another preferred embodiment of the present invention, the carrying means is a belt conveyor of a heat-resistant net having a mesh size up to 50 mm×50 mm or a roller conveyor of a group of continuous heat-resistant rollers having a pitch of 1 to 300 mm.

The rapidly heated substrate is cooled by the cooling device 10 to room temperature. This device is constructed so that when the substrate is placed in an atmosphere of room temperature, the substrate can be cooled to room temperature. So far as the temperature of the substrate can be decreased to room temperature, this cooling device may be constructed so that the substrate simply comes into contact with air of room temperature to lower the temperature of the substrate, or alternatively may be constructed so that air of room temperature or air having a temperature slightly above or below room temperature is forcibly blown against the substrate to lower the temperature of the substrate. In this connection, it should be noted that rapid cooling has a fear of cracking or the like being created on the surface of the antifouling material. Therefore, preferably, the cooling is carried out at a highest possible rate with caution so as not to create cracking or other unfavorable phenomenon.

FIG. 6 shows an apparatus provided with a preheating device for preheating the substrate before coating of the coating composition. The preheating device can heat the substrate and raise the temperature of the surface of the substrate to a temperature high enough for evenly coating the coating composition. In the apparatus shown in FIG. 6, a preheating device 11 is provided before the coating device 8. As described above, preferably, the surface of the substrate is heated by this preheating device to a temperature of 20 to 400° C. It is a matter of course that an apparatus, shown in FIG. 4, comprising a substrate molding device 5, a grazing device 6, and a firing device 7 may be connected upstream of the preheating device 11. In this connection, however, since the substrate fired in the firing device 7 still has high temperature, when the antifouling material is produced continuously from the production of a substrate, the provision of this preheating device is generally unnecessary. Therefore, the preheating device would be generally necessary when the substrate has been separately produced and hence does not have satisfactory temperature.

Further, in the apparatus shown in FIG. 6, a drying device 12 for drying the substrate coated with the coating composition by means of the coating device 8 is provided before the rapid heating device 9. This drying device 12 comprises air blowing means or heating means to remove excess water or solvent component from the surface of the substrate. In the apparatus shown in FIG. 6, the rapid heating device 9 and the cooling device 10 may be identical respectively to those shown in FIG. 4.

EXAMPLES

The present invention will be described in more detail with reference to the following examples, though it is not limited to these examples only.

Example A-1

Potassium silicate (0.1% by weight), 0.1% by weight of lithium silicate, and 0.001% by weight of alumina were dispersed in water to prepare a coating composition. The coating composition was spray coated at a coverage of 25 g/m$^2$ onto the surface of a glass substrate with the surface being heated to 100° C. The coated glass substrate was placed in a roller hearth kiln, and heat treated at an atmosphere temperature within the kiln of 350° C. for 30 min. Thus, an inorganic layer was formed on the glass.

The surface of this inorganic layer had a contact angle thereof with water of 15 degrees, a contact angle thereof with an oil of 25 degrees, a center line average roughness Ra of 20 nm, a half-value period of electrification of 0.3 sec, and a zeta potential at pH 7 of −20 mV. A greasy contaminant prepared by mixing carbon black with an oil was linearly dropped on the surface of the glass, and water was then dropped from both sides of this line. As a result, this contaminant floated on the surface of water, and was simply removed from the surface of the glass.

Comparative Example A-1

Heat treatment was carried out in the same manner as in Example 1, except that the inorganic layer was not formed on the surface of the glass substrate. The surface of the treated glass had a contact angle thereof with water of 31 degrees, a contact angle thereof with an oil of 22 degrees, a center line average roughness Ra of 2 nm, a half-value period of electrification of 120 sec, and a zeta potential at pH 7 of −2 mV. In the same manner as in Example 1, the greasy contaminant prepared by mixing carbon black with an oil was linearly dropped on the surface of the glass, and water was then dropped from both sides of this line. As a result, this contaminant strongly adhered onto the surface of the glass, and could not be simply removed from the surface of the glass.

Example A-2

At the outset, ultraviolet light was applied from a BLB lamp to a mixture containing a copper-doped alkali dispersion type titanium oxide sol and silver nitrate. Thus, a titanium oxide sol was prepared wherein silver ions had been supported as a metal by photocatalytic reducing power. This titanium oxide sol (0.2% by weight) and 0.4% by weight of potassium silicate were dispersed in water to prepare a coating composition. The coating composition thus obtained was spray coated at a coverage of 25 g/m$^2$ onto the surface of a glazed tile with the surface being heated to 120° C. The coated, glazed tile was rapidly heated at an atmosphere temperature within the furnace of 850° C. for 15 sec. Thus, an inorganic layer was formed on the glazed tile.

The surface of this inorganic layer had a contact angle thereof with water of 0 degree, a contact angle thereof with an oil of 16 degrees, a half-value period of electrification of 0.1 sec, and a zeta potential at pH 7 of −30 mV. A greasy contaminant prepared by mixing carbon black with an oil was linearly dropped on the surface of the glazed tile, and water was then dropped from both sides of this line. As a result, this contaminant floated on the surface of water, and was simply removed from the surface of the glazed mat tile. Further, the treated, glazed tile had photocatalytic activity, that is, antimicrobial (bactericidal) activity, antifouling activity, deodorant activity and other degradation activity. Furthermore, the thin layer formed on the surface of the tile was a strong layer which had a strength (hardness) of not less than 4 in terms of Mohs hardness and possessed excellent abrasion resistance and chemical resistance.

Comparative Example A-2

An inorganic layer was formed on the surface of a glazed tile in the same manner as in Example A-2, except that the coating composition did not contain potassium silicate. The inorganic layer thus obtained was easily separated from the surface of the glazed tile.

Comparative Example A-3

The coating composition as used in Example A-2 was spray coated on the surface of a glazed mat tile in the same manner as in Example A-2. The coated, glazed tile was heat treated within a roller hearth kiln at an atmosphere temperature within the kiln of 800° C. for 60 min. Thus, an inorganic layer was formed on the glazed tile.

The surface of the treated glazed tile had a contact angle thereof with water of 31 degrees, a contact angle thereof with an oil of 21 degrees, and a half-value period of electrification of 15 sec. The greasy contaminant as used in Example 1 was linearly dropped on the surface of the glazed tile, and water was then dropped from both sides of this line. As a result, this contaminant strongly adhered onto the surface of the tile, and could not be simply removed from the surface of the glazed tile.

Example A-3

Potassium silicate (0.2% by weight) and 0.4% by weight of lithium silicate were dispersed in water to prepare a coating composition. The coating composition was spray coated at a coverage of 25 g/m$^2$ onto the surface of a glass substrate with the surface being heated to 100° C. The coated glass substrate was heat treated within a roller hearth kiln at an atmosphere temperature within the kiln of 350° C. for 30 min. Thus, an inorganic layer was formed on the surface of the glass. The surface of the inorganic layer was rubbed 100 times by a hard type eraser while applying a pressure of 1000 gf/cm$^2$. As a result, the inorganic layer remained unchanged and remained strongly adhered onto the glass substrate.

Comparative Example A-4

An inorganic layer was formed on a glass substrate in the same manner as in Example A-3, except that the atmosphere temperature within the kiln in the heat treatment was changed to 130° C. The surface of the inorganic layer was rubbed 100 times by a hard type eraser while applying a pressure of 1000 gf/cm$^2$. As a result, the inorganic thin layer was separated from the glass substrate, demonstrating that the adhesion between the inorganic thin layer and the glass as the substrate was poor.

Separately, an inorganic layer was formed in the same manner as in Example A-3, except that the atmosphere temperature within the kiln in the heat treatment was changed to 800° C. The surface of the inorganic layer was rubbed 100 times by a hard type eraser while applying a pressure of 1000 gf/cm$^2$. As a result, the inorganic thin layer was separated from the glass substrate.

Example A-4

An alkali dispersion type titanium oxide sol (0.1% by weight) and 0.4% by weight of lithium silicate were first dispersed in water to prepare a coating composition. The surface of a calcium silicate plate having an inorganic coating was subjected to corona discharge treatment. The surface of the treated calcium silicate plate was then heated to 80° C., and the coating composition was spray coated at a coverage of 25 g/m$^2$ onto the surface of the treated calcium silicate plate. The coated, calcium silicate plate was then rapidly heated at an atmosphere temperature within the furnace of 500° C. for 20 sec. Thus, an inorganic layer was formed on the calcium silicate plate having an inorganic coating.

The surface of this inorganic layer had a contact angle thereof with water of 1 degree, a contact angle thereof with an oil of 20 degrees, a half-value period of electrification of 0.1 sec, and a zeta potential at pH 7 of −25 mV. A greasy contaminant prepared by mixing carbon black with an oil was linearly dropped on the surface of the calcium silicate plate having an inorganic coating, and water was then dropped from both sides of this line. As a result, this greasy contaminant floated on the surface of water, and could be simply removed from the surface of the calcium silicate plate having an inorganic coating. Further, the treated calcium silicate plate having an inorganic coating had photocatalytic activity, that is, antimicrobial activity, antifouling activity, deodorant activity and other degradation activity. Furthermore, the inorganic layer formed on the surface of the calcium silicate plate having an inorganic coating was a strong layer which had a strength (hardness) of not less than 4 in terms of Mohs hardness and possessed excellent abrasion resistance and chemical resistance.

Example B-1
(a) Preparation of Coating Composition

At the outset, 5% by weight of lithium silicate (tradename Lithium Silicate 35, manufactured by Nippon Kagaku Kogyo Co., Ltd.) and 0.01% by weight of a surfactant (tradename Emulgen 707, manufactured by Kao Corp.) were dispersed in water to prepare a coating composition.
(b) Preparation of Substrate In an apparatus shown in FIG. 4, a starting material for ceramic ware was pressed in a forming device 5 to prepare a body. A glaze was then coated onto the surface of the body in a glazing device 6. Subsequently, the coated body was passed through a roller hearth kiln as a firing device 7 kept at a firing temperature of 1150° C. over a period of 40 min to perform firing. Thus, a tile was obtained.
(c) Production of Antifouling Material When the temperature of the tile became 150° C. at the outlet of the roller hearth kiln, the coating composition prepared above was spray coated onto the surface of the tile. The coverage of the coating composition was 20 g/m$^2$. Since the temperature of the tile was as high as 150° C., excess water was instantaneously evaporated. As a result, only solid matter was evenly stacked on the surface of the tile to form an about 0.5 μm-thick thin layer.

The tile was then carried in a furnace as a rapid heating device provided continuously from the firing device 7. The furnace had heating elements densely arrayed on the upper part of the interior thereof. The temperature of the atmosphere in the furnace was about 800 to 1000° C., the heating value per unit area within the furnace was about 1600 MJ/m$^2$·hr, and the heating area was 30 cm×150 cm. The time of residence of the tile within the furnace was about 30 sec, and the time for which the tile had been placed under the heating elements was about 10 sec. The rapid heating permitted the thin layer formed on the surface of the tile to be completely fixed onto the surface of the tile.

The surface of the tile carried out from the furnace had a temperature increased to 300 to 350° C. Subsequently, the tile was introduced into a cooling device where the tile was sprayed with cold air blown from above and below the tile. The tile was cooled to 100–150° C. during the period of time for which the tile was traveled by 3 m through the cooling device.

The tile as an antifouling material thus obtained had high antifouling activity against greasy stains or soils and, in addition, had high hydrophilicity. The thin layer formed on the surface of the tile was a strong layer which had a strength (hardness) of not less than 4 in terms of Mohs hardness and possessed excellent abrasion resistance and chemical resistance.

The heat of wetting of the thin layer by water was determined and found to be as high as 100 erg/cm$^2$, suggesting that the thin layer had satisfactory hydrophilicity. The heat of wetting is regarded as a measure of wettability by a solvent, and higher heat of wetting means that the wettability by the solvent is higher.

Example B-2

(a) Preparation of Coating Composition

Potassium silicate (tradename Snowtex K, manufactured by Nissan Chemical Industry Ltd.) was dispersed in water to prepare a coating composition having a potassium silicate content of 1% by weight. Further, 1 part by weight, based on 100 parts by weight of the potassium silicate sol, of a 3% aqueous copper acetate solution was added.

(b) Preparation of Substrate

A large tile (0.9 m×1.8 m) was prepared in the same manner as in Example 1. Specifically, a starting material for ceramic ware was extruded by means of a forming device 5 in the apparatus shown in FIG. 4 to prepare a body. A glaze was then coated onto the surface of the body by means of a glazing device 6. The coated body was passed through a roller hearth kiln as a firing device 7 kept at a firing temperature of 1150° C. over a period of 3 hr to perform firing. Thus, a large tile was obtained.

(c) Production of Antifouling Material

When the temperature of the tile became 80° C., the coating composition was spray coated onto the surface of the tile as used in Example 1. The coverage of the coating composition was 15 $g/m^2$. Since the temperature of the tile was as high as 80° C., excess water was instantaneously evaporated. As a result, only solid matter was evenly stacked on the surface of the tile to form an about 0.2 $\mu$m-thick thin layer.

The tile was then carried in a furnace as a rapid heating device continuously provided from the firing device 7. The furnace had heating elements densely arrayed on the upper part of the interior thereof. The temperature of the atmosphere in the furnace was about 800 to 1000° C., the heating value per unit area within the furnace was about 1600 $MJ/m^2 \cdot hr$, and the heating area was 1.5 m×28 m. The time of residence of the tile within the furnace was about 60 sec, and the time for which the tile had been placed under the heating elements was about 50 sec. The rapid heating permitted the thin layer formed on the surface of the tile to be completely fixed onto the surface of the tile.

The surface of the tile carried out from the furnace had a temperature increased to 200 to 250° C. Subsequently, the tile was introduced into a cooling device where the tile was sprayed with water. In the cooling device, the tile was cooled to 100–150° C. during the period of time for which the tile was traveled by 10 m through the cooling device.

The tile as an antifouling material thus obtained had antimicrobial activity and antialgae activity. Further, the thin layer formed on the surface of the tile was a strong layer which had a strength (hardness) of not less than 4 in terms of Mohs hardness and possessed excellent abrasion resistance and chemical resistance.

Example B-3

(a) Preparation of Coating Composition

A lithium silicate borate mixed liquid (tradename SLN 55, manufactured by Nippon Kagaku Kogyo Co., Ltd.) and a cerium oxide sol (tradename AS-520, manufactured by Taki Chemical Co., Ltd.) were mixed together so as to have a concentration of 0.1% by weight and 0.1% by weight, respective, to prepare a coating composition.

(b) Substrate

A glass plate having a size of 1 m×1 m was provided as a substrate.

(c) Production of Antifouling Material

At the outset, the glass plate was heated to a surface temperature of 40° C. by means of a preheating device with the temperature set at 40° C. Thereafter, the coating composition was spray coated on the surface of the preheated glass plate. The coverage was 5 $g/m^2$. Since the temperature of the glass substrate was as low as 40° C., the water were less likely to be evaporated. For this reason, after coating of the coating composition, the coating was dried at 100° C. The coating followed by drying was repeated three times. This permitted only solid matter to be evenly stacked on the surface of the glass plate to form an about 0.1 $\mu$m-thick thin layer.

Next, the glass plate with a thin layer formed thereon was carried in a furnace as a rapid heating device provided continuously from the preheating device. The furnace had heating elements densely arrayed on the upper part of the interior thereof. The temperature of the atmosphere in the furnace was about 550° C. The time of residence of the glass plate within the furnace was about 2 sec. The rapid heating permitted the thin layer formed on the glass substrate to be completely fixed onto the surface of the glass plate.

The surface of the glass plate carried out from the furnace had a temperature increased to 250 to 350° C. Subsequently, the glass plate with a thin layer fixed thereon was introduced into a cooling device where air was forcibly blown against the glass plate. In the cooling device, the glass plate was cooled to 50–150° C. during the period of time for which the glass plate was traveled by 3 m through the cooling device.

The antifouling material thus obtained had high surface smoothness, high ultraviolet absorption capacity, and, in addition, excellent hydrophilicity and antifouling properties. Further, the heat of wetting of the thin layer by water was determined and found to be as high as 500 $erg/cm^2$. The thin layer formed on the surface of the glass plate was a strong layer which had a hardness (Mohs hardness) of not less than 4 and possessed excellent abrasion resistance and chemical resistance.

Example C-1

An aqueous solution containing 0.5% by weight of potassium silicate was prepared as a coating composition. The coating composition was spray coated at a coverage of 25 $g/m^2$ onto the surface of a tile with the surface being heated to 100° C. The coated tile was heat treated within a roller hearth kiln at an atmosphere temperature within the kiln of 150° C., 350° C., or 550° C. for 30 min. Thus, inorganic layers was formed on the surface of the tile. A cylinder having a diameter of 4 cm was fixed onto the inorganic layers. Distilled water (30 g) was introduced into the cylinder, followed by standing at an atmosphere temperature of 50° C. for 2 to 24 hr. 2 hr, 6 hr, and 24 hr after the initiation of the standing, the amount of potassium eluted was quantitatively determined by atomic absorption spectroscopy. The results of evaluation are shown in FIG. 7.

For the sample which had been heat treated at 150° C., upon immersion of the sample in the warm water for 6 hr, potassium contained in the layer was entirely eluted. In this layer, non-bridging oxygen (particularly silanol groups (M—OH)) was present in an amount large enough to exhibit hydrophilicity. Since the development of a three-dimensional network structure of silica was unsatisfactory, the inorganic layer was considered to have somewhat poor abrasion resistance and water resistance.

For the sample which had been heat treated at 350° C., upon immersion of the sample in the warmwater for 6 hr, 30% of potassium contained in the layer was eluted. In this layer, since the three-dimensional network structure of silica was suitably developed, the layer strength was high and the abrasion resistance was excellent. Further, by virtue of the suitable development of the three-dimensional network structure, a large amount of non-bridging oxygen (particularly ionically bonded ones M—O—X+) was present in this layer, suggesting that this sample had high hydrophilicity and excellent antifouling properties. That is, this sample had the best balance between the antifouling properties and the abrasion resistance.

For the sample which had been heat treated at 550° C., upon immersion of the sample in the warm water for 6 hr, 15% of potassium contained in the layer was eluted. In this layer, since the three-dimensional network structure of silica was sufficiently developed, it is considered that the amount of non-bridging oxygen is small although the abrasion resistance and the water resistance are high.

The results of the potassium elution test show the presence of M—O—X+ as non-bridging oxygen in the inorganic layer. That is, the test results suggest that, as compared with the heat treatment at 150° C. and 550° C., the heat treatment at 350° C. creates the presence of a larger amount of non-bridging oxygen (M—O—X+) in the inorganic layer. On the other hand, the mechanical strength of the inorganic layer is increased in the following order: 150° C.<350° C.<550° C.

Example C-2

The contact angle in water of the inorganic layer with an oil was measured as an index of the releasability of greasy contaminant from the inorganic layer according to the present invention. At the outset, the coating composition as used in Example C-1 was spray coated at a coverage of 25 g/m$^2$ onto the surface of a tile with the surface being heated to 100° C. The coated tile was heat treated within a roller hearth kiln at an atmosphere temperature within the kiln of 150° C., 350° C., or 450° C. for 30 min. Thus, inorganic layers was formed on the surface of the tile. For the inorganic layers, the contact angle in water thereof with a salad oil, $\theta o(w)$, was measured.

FIG. 7 schematically illustrate the measurement of the contact angle in water of the inorganic layer with an oil. As shown in FIG. 7, an oil 36 was dropped on an inorganic layer 34 formed on a substrate 33. The inorganic layer 34 was immersed in water 32 contained in a glass container 31 through a pedestal 35 so that the oil-deposited face faced downward. At that time, the contact angle of the inorganic layer with the oil was measured. The contact angle was measured with a contact angle goniometer (CA-X150, manufactured by Kyowa Interface Science Co., Ltd.). A salad oil as a widely used edible oil, oleic acid contained as a main component in various animal and vegetable oils, and n-octane as a hydrocarbon oil were used as the oil.

Comparative Example C-1

The coating composition as used in Example C-1 was spray coated at a coverage of 25 g/m$^2$ onto the surface of a tile with the surface being heated to 100° C. The coated tile was heat treated within a roller hearth kiln at an atmosphere temperature within the kiln at 800° C. for 30 min. Thus, an inorganic layer was formed on the surface of the tile. For the inorganic layer, the contact angle in water thereof with a salad oil, $\theta o(w)$, was measured.

Example C-3

Potassium silicate was dried at 100° C. for two days, and then thermogravimetrically analyzed with TG/DTA 320, manufactured by Seiko Instruments Inc. The measuring temperature ranged from room temperature to 800° C., and the temperature rise rate was 2° C./min.

The results of Examples C-2 and C-3 and Comparative Example C-1 were as shown in FIG. 9.

For Example C-2, all the samples had a high contact angle in water of the inorganic layer with the oil of not less than 120 degrees, that is, had excellent greasy contaminant releasing properties. On the other hand, for Comparative Example C-1, the sample had a low contact angle in water of the inorganic layer with the oil of not more than 90 degrees. When the heat treatment temperature exceeded about 500° C., there was a rapid degrease in the contact angle in water of the inorganic layer with the oil. In the case of the inorganic layer in Comparative Example C-1, the greasy contaminant deposited on the inorganic layer could not be removed simply by washing with water.

The results of the thermogravimetric analysis of potassium silicate in Example C-3 show that, upon a temperature rise in the heat treatment temperature, weight reduction occurs in two stages. The weight reduction on the lower temperature side is considered attributable to the removal of physically adsorbed water in potassium silicate, while the weight reduction on the higher temperature side is considered attributable to the removal of chemical adsorbed water and a structural change. The structural change in potassium silicate is considered to be mainly caused by dehydration as a result of condensation of hydroxyl groups remaining in the sample. It is expected that the three-dimensional network structure of silica is developed through the structural change.

The temperature region, in which the contact angle in water of the inorganic layer with the salad oil had been remarkably lowered in Example C-2 and Comparative Example C-1, was in good agreement with the weight reduction temperature on the higher temperature side in the thermogravimetric analysis in Example C-3.

The results of the heat treatment temperature dependency of the thermogravimetric analysis and the contact angle in water of the inorganic layer suggest that the structure of the silica skeleton in the alkali metal silicate contributes greatly to excellent greasy contaminant releasing properties. That is, the inorganic layer according to the present invention is considered to develop excellent greasy contaminant releasing properties by synergistic effect of the alkali metal and the non-bridging oxygen atom.

Example C-4

Coating compositions containing alkali metal silicates according to formulations shown in Table 1 were prepared. The coating compositions were spray coated at a coverage of 25 g/m$^2$ onto the surface of a tableware with the surface being heated to 100° C. The coated tableware was heat treated within a roller hearth kiln at an atmosphere temperature within the kiln of 350° C. for 30 min. Thus, inorganic layers were formed on the surface of the tableware.

Before and after the immersion of the samples in warm water of 50° C. for 6 hr, the samples were evaluated for the releasability of the greasy contaminant on the inorganic layers. The immersion in warm water corresponds to the inorganic layers after repeated washing. For the inorganic layer samples, the contact angle in water of the inorganic layer with a salad oil ($\theta o(w)$) before and after the immersion of the samples in warm water of 50° C. for 6 hr and the contact angle in air of the inorganic layer with water ($\theta w$) and the contact angle in air of the inorganic layer with a salad oil ($\theta o$) before the immersion in warm water were measured.

A greasy stain releasing test was carried out as follows. An oil was applied in an area of 5 cm×5 cm on the inorganic layer formed on the surface of the substrate. The sample was then slanted by 45 degrees, and, in this state, running water was flowed at a rate of 2400 g/min from above the oil-coated face. This oil staining-water washing cycle was repeated five times. After the repetition of the greasy stain releasing test five times, the level of the oil remaining on the surface of the inorganic layer was determined, and the results were reduced to four evaluation grades A to D with A being the best. When no greasy stain was observed on the surface of the inorganic layer upon washing with water in an amount of less than 100 cc after the five staining-washing cycles, the greasy stain releasing property was revaluated as "A"; when no greasy stain was observed on the surface of the inorganic layer upon washing with water in an amount of not less than 100 cc after the five staining-washing cycles, the greasy stain releasing property was revaluated as "B"; when a small amount of the greasy stain remaining removed from the surface of the inorganic layer after the five staining-washing cycles was removed and became unnoticeable upon wiping off with a sponge in combination with water washing, the greasy stain releasing property was revaluated as "C"; and when the greasy stain on the inorganic layer substantially entirely remained unremoved after the five staining-washing cycles and could not be removed without use of a neutral detergent, the greasy stain releasing property was evaluated as "D." A salad oil as a widely used edible oil, oleic acid contained as a main component in various animal and vegetable oils, or n-octane as a mineral oil (hydrocarbon) were used as the oil.

TABLE 1

| Sample No. | Material(s) contained in aqueous solution | $SiO_2$, wt % | $K_2O$, wt % | $Li_2O$, wt % | Firing temp., °C. |
|---|---|---|---|---|---|
| 1 | Potassium silicate | 0.5 | 0.2 | 0 | 350 |
| 2 | Lithium silicate A | 0.5 | 0 | 0.075 | 350 |
| 3 | Lithium silicate B | 0.5 | 0 | 0.041 | 350 |
| 4 | Potassium silicate + Lithium silicate A | 0.25 + 0.25 + | 0.1 + 0 | 0 + 0.0375 | 350 |
| 5 | Potassium silicate + Silica sol | 0.32 + 0.18 | 0.13 + 0 | 0 + 0 | 350 |

Example C-5

Potassium silicate having a composition shown in Table 2 and a titanium oxide (anatase form) sol were dispersed in water to prepare coating compositions. The coating compositions were spray coated at a coverage of 25 g/m² onto the surface of a tile with the surface being heated to 100° C. The coated tile was heat treated within a roller hearth kiln at an atmosphere temperature within the kiln of 350° C. for 30 min. Thus, inorganic layers was formed on the surface of the tile.

These inorganic layers were evaluated in the same manner as in Example C-4. Titanium oxide is known to be an oxide semiconductor having photocatalytic activity and to exhibit superhydrophilification ability and strong oxidizing power upon photoexcitation. Therefore, titanium oxide can provide excellent antifouling properties under an environment exposed to sunlight. In this example, the sample was evaluated without light irradiation for the excitation of titanium oxide. This experimental condition was used in order to demonstrate that, even in the case where sufficient light is not present under a daily life environment, the inorganic layer has excellent greasy stain releasing properties.

TABLE 2

| Sample No. | Material(s) contained in aqueous solution | $SiO_2$, wt % | $K_2O$, wt % | $Li_2O$, wt % | Firing temp., °C. |
|---|---|---|---|---|---|
| 6 | Potassium silicate | 0.5 | 0.2 | 0 | 550 |
| 7 | Lithium silicate A | 0.5 | 0 | 0.075 | 550 |
| 8 | Lithium silicate B | 0.5 | 0 | 0.041 | 550 |

Example C-6

Alkali metal silicates having compositions shown in Table 3 were dispersed in water to prepare coating compositions. The coating compositions were spray coated at a coverage of 25 g/m² onto the surface of a tile with the surface being heated to 100° C. The coated tile was rapidly heat treated at an atmosphere temperature within the furnace of 850° C. for 15 sec. Thus, inorganic layers was formed on the surface of the tile. These inorganic layers were evaluated in the same manner as in Example C-4.

TABLE 3

| Sample No. | Material(s) contained in dispersion | $SiO_2$, wt % | $K_2O$, wt % | $Ti_2O$, wt % | Firing temp., °C. |
|---|---|---|---|---|---|
| 9 | Potassium silicate + Titanium oxide sol | 0.4 | 0.16 | 0.1 | 350 |
| 10 | Potassium silicate + Titanium oxide sol | 0.3 | 0.12 | 0.2 | 350 |
| 11 | Potassium silicate + Titanium oxide sol | 0.1 | 0.04 | 0.4 | 350 |

Comparative Example C-2

Alkali metal silicates having compositions shown in Table 4 were dispersed in water to prepare coating compositions. The coating compositions were spray coated at a coverage of 25 g/m² onto the surface of a tile with the surface being heated to 100° C. The coated tile was heat treated within a roller hearth kiln at an atmosphere temperature within the kiln of 800° C. for 30 min. Thus, inorganic layers was formed on the surface of the tile. These inorganic layers were evaluated in the same manner as in Example C-4.

TABLE 4

| Sample No. | $\theta o(w)$, ° | $\theta w$, ° | $\theta o$, ° | Evaluation result on releasability of greasy stain |
|---|---|---|---|---|
| 1 | 160.8 | 0 | 22.3 | A |
| 2 | 159.9 | 2.1 | 25.4 | A |
| 3 | 166.5 | 2.3 | 26 | A |
| 4 | 160.2 | 4.1 | 22.7 | A |
| 5 | 160 | 0 | 25.8 | A |
| 6 | 83.8 | 9.9 | 24.5 | D |
| 7 | 91.5 | 22.6 | 28.4 | D |
| 8 | 83.3 | 22.1 | 28.1 | D |
| 9 | 159.2 | 1.6 | 10 | A |
| 10 | 151.2 | 0 | 10.3 | A |
| 11 | 31 | 0 | 8.2 | D |
| Untreated tile | 115 | 18 | 20.5 | C |

Comparative Example C-3

An untreated tile having no inorganic layer on its surface was evaluated in the same manner as in Example C-4.

The results of the evaluation for Examples C-4, C-5, and C-6 and Comparative Examples C-2 and C-3 were as shown in Table 5.

TABLE 5

| Sample No. | θo(w), ° | θw, ° | θo, ° | Evaluation result on releasability of greasy stain |
|---|---|---|---|---|
| 1 | 160.8 | 0 | 22.3 | A |
| 2 | 159.9 | 2.1 | 25.4 | A |
| 3 | 166.5 | 2.3 | 26 | A |
| 4 | 160.2 | 4.1 | 22.7 | A |
| 5 | 160 | 0 | 25.8 | A |
| 6 | 83.8 | 9.9 | 24.5 | D |
| 7 | 91.5 | 22.6 | 28.4 | D |
| 8 | 83.3 | 22.1 | 28.1 | D |
| 9 | 159.2 | 1.6 | 10 | A |
| 10 | 151.2 | 0 | 10.3 | A |
| 11 | 31 | 0 | 8.2 | D |
| Untreated tile | 115 | 18 | 20.5 | C |

Example C-7

Alkali metal silicates having compositions shown in Table 6 were dispersed in water to prepare coating compositions. The coating compositions were spray coated at a coverage of 25 g/m² onto the surface of a tile with the surface being heated to 100° C. The coated tile was heat treated within a roller hearth kiln at an atmosphere temperature within the kiln of 350° C. for 30 min. Thus, inorganic layers were formed on the surface of the tile. For these inorganic layers, before and after immersion in warm water of 50° C. for 6 hr, the contact angle in water thereof with oleic acid and the contact angle in water thereof with n-octane were measured. Further, these inorganic layers were evaluated for the releasability of oleic acid and n-octane as greasy stains.

TABLE 6

| Sample No. | Material(s) contained in aqueous solution | SiO₂, wt % | K₂O, wt % | Li₂O, wt % | Heat treatment conditions |
|---|---|---|---|---|---|
| 14 | Lithium silicate | 0.5 | 0 | 0.075 | 350° C. × 30 min |
| 15 | Lithium silicate | 0.5 | 0 | 0.041 | 350° C. × 30 min |
| 16 | Lithium silicate + Potassium silicate | 0.25 + 0.25 | 0.1 + 0 | 0 + 0.02 | 350° C. × 30 min |

The results of Example C-7 were as shown in Table 7.

TABLE 7

| Sample No. | Releasability of greasy stain | | θo(w), ° | |
|---|---|---|---|---|
| | Oleic acid | n-Octane | Oleic acid | n-Octane |
| | Before immersion in warm water of 50° C. for 6 hr | | | |
| Ex. C-7  14 | B | A | 146.9 | 160.2 |
| 15 | A | B | 165.8 | 159.8 |
| 16 | A | A | 163.7 | 161.2 |
| | After immersion in warm water of 50° C. for 6 hr | | | |
| Ex. C-7  14 | C | C | 119.4 | 121.7 |
| 15 | A | B | 150.8 | 134.4 |
| 16 | B | B | 143.2 | 131.5 |

Example C-8

Various alkali metal silicates having compositions shown in Table 8 either alone or in combination with TiO₂ were dispersed in water to prepare coating compositions. In this case, SLN 73 manufactured by Nippon Kagaku Kogyo Co., Ltd. was also used as an alkali metal silicate containing a plurality of alkali metal species and, in addition, boron. These coating compositions were spray coated at a coverage of 25 g/m² onto the surface of a tile with the surface being heated to 100° C. The coated tile was heat treated within a roller hearth kiln at an atmosphere temperature within the kiln of 350° C. for 30 min. Thus, inorganic layers were formed on the surface of the tile.

For these inorganic layers, before and after immersion in warm water of 50° C. for 6 hr, the contact angle in water thereof with a salad oil (θo(w)) was measured. Further, these inorganic layers were evaluated for the releasability of a salad oil as a greasy stain. Further, the inorganic layers were evaluated for the layer strength by performing a sliding test before and after the immersion in warm water. In the sliding test, the inorganic layers were rubbed 100 times by a hard type eraser while applying a pressure of as 1000 gf/cm², followed by inspection of the surface state of the inorganic layers. The results were reduced to evaluation grades A to D.

When the inorganic layer surface substantially remained unchanged and retained a very good state, the layer strength was evaluated as "A"; when the inorganic layer surface underwent a slight change but still retained a good state, the layer strength was evaluated as "B"; when a part of the surface of the inorganic layer was damaged, the layer strength was evaluated as "C"; and when the surface of the inorganic layer was significantly damaged, the layer strength was evaluated as "D."

TABLE 8

| Sample No. | Material(s) contained in aqueous solution | SiO₂, wt % | Li₂O, wt % | K₂O, wt % | Na₂O, wt % | B₂O₃, wt % | TiO₂, wt % | Heat treatment conditions |
|---|---|---|---|---|---|---|---|---|
| 17 | Potassium silicate | 0.5 | 0 | 0.2 | 0 | 0 | 0 | 350° C. × 30 min |
| 18 | Potassium silicate + Lithium silicate | 0.25 + 0.25 | 0 + 0.0375 | 0.1 + 0 | 0 | 0 | 0 | 350° C. × 30 min |
| 19 | SLN 73 | 0.5 | 0.043 | 0 | 0.063 | 0.008 | 0 | 350° C. × 30 min |
| 20 | SLN 73 + Titanium oxide sol | 0.5 | 0.043 | 0 | 0.063 | 0.008 | 0.1 | 350° C. × 30 min |

The results of Example C-8 are summarized in Table 9.

TABLE 9

|  | Sample No. | Before immersion in warm water of 50° C. for 6 hr | | | After immersion in warm water of 50° C. for 6 hr | | |
|---|---|---|---|---|---|---|---|
|  |  | Layer strength | θo(w),° | Releasability of greasy stain | Layer strength | θo(w),° | Releasability of greasy stain |
| Example C-8 | 17 | B | 160.8 | A | D | 136 | B |
|  | 18 | B | 160.2 | A | C | 146.8 | A |
|  | 19 | B | 151.2 | A | B | 136.5 | B |
|  | 20 | B | 161.3 | A | B | 140 | A |

Example D-1

An alkali silicate (Lithium Silicate 35, manufactured by Nissan Chemical Industry Ltd.) (3% by weight) was dispersed in water to prepare a coating composition. The coating composition was spray coated onto the surface of a glazed tile having a size of 15 cm square (AB02E01, manufactured by TOTO, LTD.). The coated tile was fired at an atmosphere temperature of 850° C. for 10 sec to bring the surface temperature of the substrate to 300° C. At that time, the presence of zircon and unmelted silica particles in the glass layer on the surface of the glazed tile was confirmed by EPMA. A layer of lithium silicate was formed there on to prepare a sample with an inorganic layer formed thereon. The layer thickness was 3 μm.

Immediately after firing, the contact angle of the sample with water was measured with a contact angle goniometer (Model CA-X150, manufactured by Kyowa Interface Science Co., Ltd.; detection limit on low angle side: 1 degree), and found to be 5 degrees. The contact angle was measured 30 sec after dropping of a water droplet through a microsyringe on the surface of the sample. The sample was allowed to stand in a dark place for one week, followed by the measurement of the contact angle. As a result, the contact angle of the sample with water remained unchanged and was 5 degrees. Next, one drop of a salad oil was put on this tile and, the tile was then immersed in water. Thirty sec after the initiation of immersion, the contact angle in water of the sample with the oil was measured. As a result, the reading of the contact angle goniometer was 140 degrees, indicating that the surface of the sample was oil repellent in water. Further, the sample had a zeta potential at pH 7 of −20 mV and a half-value period of electrification of 8 sec.

Example D-2

An alkali silicate (Potassium Silicate 1K, manufactured by Nippon Kagaku Kogyo Co., Ltd.) (0.2% by weight), 0.1% by weight of a silica sol (Snowtex O, manufactured by Nissan Chemical Industry Ltd.), and 0.001% by weight of an alumina sol (AS 520, manufactured by Nissan Chemical Industry Ltd.) were dispersed in water to prepare a coating composition. The coating composition was spray coated onto the surface of a glazed tile having a size of 15 cm square (AB02E01). The coated tile was fired at a temperature of 400° C. for 40 min. Thus, a sample with an alkali silicate layer being formed thereon was obtained.

At that time, the presence of zircon and unmelted silica particles in the glass layer on the surface of the glazed tile was confirmed by EPMA. The layer thickness was 0.2 μm. The glossiness of the tile was 50. Immediately after firing, the contact angle of the sample with water was measured, and found to be 0 degree. The sample was allowed to stand in a dark place for two weeks, followed by the measurement of the contact angle thereof with water. As a result, the contact angle was 3 degrees. Further, the contact angle in water of the sample with a salad oil was 120 degrees. The sample had a half-value period of electrification of 7 sec and a surface roughness of Ra=25 nm and Sm=200 nm.

Example D-3

An alkali silicate (Lithium Silicate 35, manufactured by Nissan Chemical Industry Ltd.) (1% by weight), 0.5% by weight of a silica sol (Snowtex OUP, manufactured by Nissan Chemical Industry Ltd.), and 0.001% by weight of a titania sol (A-6, manufactured by Taki Chemical Co., Ltd.) were dispersed in water to prepare a coating composition. The coating composition was spray coated onto the surface of a glazed tile having a size of 15 cm square (AB02E01). The coated tile was fired at a temperature of 250° C. for 10 min. Thus, a sample with an alkali silicate-containing layer being formed thereon was obtained.

At that time, the presence of zircon particles in the glass layer on the surface of the glazed tile was confirmed by EPMA. The layer thickness was 0.2 μm. The glossiness of the tile was 70. Immediately after firing, the contact angle of the sample with water was measured, and found to be 0 degree. The sample was allowed to stand in a dark place for two weeks, followed by the measurement of the contact angle thereof with water. As a result, the contact angle was 3 degrees. Further, the contact angle in water of the sample with a salad oil was 120 degrees.

Evaluation Test on Exhaust Gas Contaminant Releasing Property

Each of the samples prepared in the examples was tested for the evaluation of exhaust gas contaminant releasing properties according to the following procedure.

At the outset, the initial diffuse reflectance of the surface of the sample was measured with a potable reflectiometer (tradename: Model PG-3D, manufactured by Nippon Denshoku Co., Ltd.). The sample was placed within a container connected directly to an exhaust pipe of a diesel car, and an exhaust gas was introduced into the container. In this case, the exhaust gas was introduced until the color difference on the surface of the sample reached about 20 or until the diffuse reflectance reached not more than 55%. Thus, the exhaust gas was forcibly deposited onto the surface of the sample. In this case, the engine speed was about 3000 rpm, and the time required for the deposition was about 10 min.

Next, the tile was washed by water spraying. In this case, running water of room temperature was sprayed as washing water against the surface of the tile at a flow rate of about 400 cc/m² and a water pressure of about 0.6 kgf/cm².

For the samples after washing, the diffuse reflectance and the restoration of the diffuse reflectance, and the color difference were measured.

All the samples prepared in the examples of the present invention did satisfy requirements, that is, a diffuse reflectance after washing of not less than 60%, a restoration of the diffuse reflectance of not less than 75%, and a color difference of not more than 5. Also after the repetition of contamination-washing cycle three times, these samples satisfied the requirements. This indicates that the antifouling materials according to the present invention have excellent antifouling properties.

According to the present invention, the antifouling requirements are more preferably such that the diffuse reflectance after washing is not less than 70%, the restoration of the diffuse reflectance is not less than 90% and the color difference is not more than 2. Some of the above samples satisfied also the more preferred requirements.

What is claimed is:

1. An antifouling material comprising:

a substrate; and an inorganic layer which is mainly composed of an alkali silicate, said inorganic layer being fixed as the outermost layer of the antifouling material;

the content of alkali metal in the inorganic layer being not less than 10% by weight as measured by X-ray photoelectron spectroscopy from the surface layer side and non-bridging oxygen being present in an amount satisfying an alkali metal elution from the inorganic layer of 0.001 to 80%, the inorganic layer having a surface which has a center line average roughness (Ra) of Ra<500 nm and having a thickness of not more than 5 $\mu$m, said inorganic layer containing the alkali metal and the non-bridging oxygen in an amount effective to remove contaminants, derived from an exhaust gas, adhered on the surface of the inorganic layer with running water alone to restore diffuse reflectance of the surface to not less than 75% of initial diffuse reflectance.

2. The and fouling material according to claim 1, wherein the restoration of the diffuse reflectance is not less than 80%.

3. The antifouling material according to claim 1, wherein the restoration of the diffuse reflectance is not less than 90%.

4. The antifouling material according to claim 1, wherein the concentration of the alkali metal in the inorganic layer is higher than the concentration of the alkali metal in the substrate.

5. The antifouling material according to claim 1, wherein the contact angle in water of the inorganic layer with oleic acid is not less than 100 degrees.

6. The antifouling material according to claim 5, wherein the contact angle is more than 120 degrees.

7. The antifouling material according to claim 6, wherein the contact angle is more than 140 degrees.

8. The antifouling material according to claim 1, wherein, after immersion of the antifouling material in warm water of 50° C. for 6 hr, the contact angle in water of the surface of the inorganic layer with oleic acid is more than 120 degrees.

9. The antifouling material according to claim 1, wherein the heat of immersion of the inorganic layer on an oil is smaller than that on water.

10. The antifouling material according to claim 1, wherein the inorganic layer has a thickness of 0.01 to 5 $\mu$m.

11. The antifouling material according to claim 1, wherein the center line average roughness (Ra) is Ra<100 $\mu$m.

12. The antifouling material according to claim 1, wherein the surface of the inorganic layer has a half-value period of electrification of not more than 10 sec.

13. The antifouling material according to claim 1, wherein the inorganic layer, when immersed in water having pH 7, has a negative zeta potential.

14. The antifouling material according to claim 1, wherein the surface of the inorganic layer has a pH exceeding 7.

15. The antifouling material according to claim 1, further comprising an amorphous metal oxide selected from the group consisting of $Al_2O_3$, $ZrO_2$, $B_2O_3$, and $P_2O_5$.

16. The antifouling material according to claim 1, wherein the alkali metal is at least one member selected from the group consisting of lithium, sodium, and potassium.

17. The antifouling material according to claim 1, wherein the inorganic layer contains an antimicrobial agent.

18. The antifouling material according to claim 1, wherein the substrate comprises: a body; and a particulate material containing glaze layer and/or a transparent thin layer provided on the body.

19. The antifouling material according to claim 1, wherein the substrate contains a particulate material in its surface.

20. The antifouling material according to claim 1, wherein the particulate material is at least one element selected from the group consisting of silicon, aluminum, iron, titanium, magnesium, calcium, zirconium, zinc, cobalt, manganese, chromium, copper, silver, lead, and nickel.

21. The antifouling material according to claim 1, wherein the inorganic layer further contains a photocatalytically active metal oxide, part of which is exposed on the surface of the inorganic layer.

22. The antifouling material according to claim 1, wherein the substrate comprises at least one member selected from the group consisting of ceramics including tiles, sanitary wares, tablewares, ceramic whitewares, glass, natural stone, cement, concrete, metals, fibers, and plastics, or a laminate of these substrates.

23. The antifouling material according to claim 1, wherein the inorganic layer is formed as a stacked or multi-layered coating.

* * * * *

UNITED STATES PATENT AND TRADEMARK OFFICE
CERTIFICATE OF CORRECTION

PATENT NO. : 6,673,433 B1
DATED : January 6, 2004
INVENTOR(S) : Saeki et al.

It is certified that error appears in the above-identified patent and that said Letters Patent is hereby corrected as shown below:

Column 29,
Line 41, should read as -- the antifouling material according to claim 1, wherein the restoration of the diffuse reflectance is not less than 80% --.

Column 30,
Line 11, should read as -- The antifouling material according to claim 1, wherein the center line average roughness (Ra) is Ra<100 nm --.

Signed and Sealed this

Ninth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.         : 6,673,433 B1
APPLICATION NO. : 09/807801
DATED              : January 6, 2004
INVENTOR(S)        : Saeki et al.

It is certified that error appears in the above-identified patent and that said Letters Patent is hereby corrected as shown below:

Title Page item [30],

Foreign Application Priority Data:

Correct:

Oct. 19, 1998 (JP)..............................9-316847 to:

Oct. 19, 1998 (JP)..............................10-316847

Signed and Sealed this

Twenty-third Day of October, 2007

JON W. DUDAS
*Director of the United States Patent and Trademark Office*